United States Patent Office.

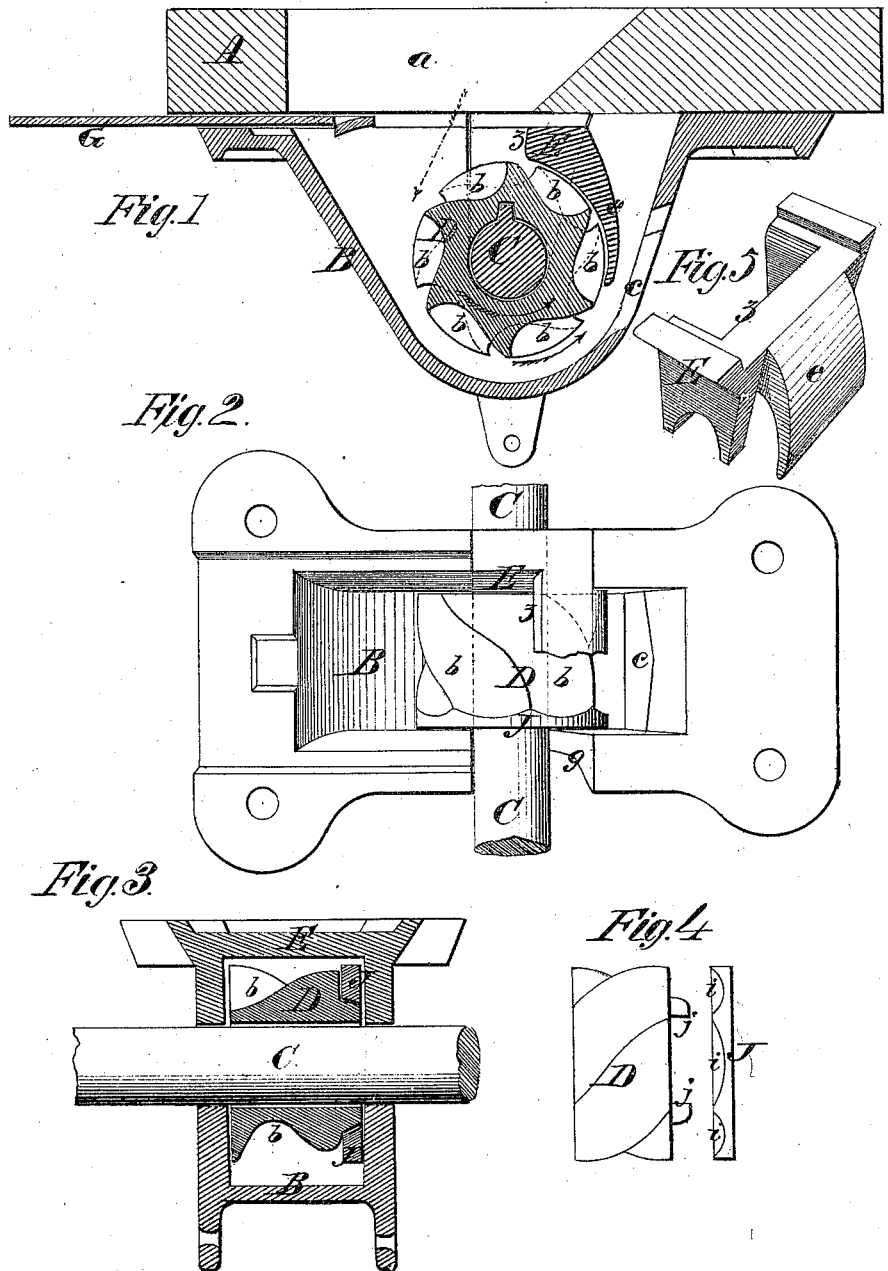

DANIEL E. McSHERRY, OF DAYTON, OHIO.

Letters Patent No. 97,425, dated November 30, 1869.

IMPROVEMENT IN DROPPING-DEVICE FOR SEEDING-MACHINES.

The Schedule referred to in these Letters Patent and making part of the same.

*To all whom it may concern:*

Be it known that I, DANIEL E. McSHERRY, of Dayton, in the county of Montgomery, and State of Ohio, have invented a new and improved Dropping-Device for Seeding-Machines; and I do hereby declare that the following is a full, clear, and exact description thereof, reference being had to the accompanying drawings, making part of this specification, in which—

Figure 1 is a section taken longitudinally and vertically through the centre of my improved seed-dropping device.

Figure 2 is a top view of the seed-cup and distributing-wheel with one-half of the cup, which is above the distributing-wheel, broken away.

Figure 3 is a section taken in a vertical plane transversely through the centre of the seed-cup and the distributing-wheel.

Figure 4 are side views of the distributing-wheel and its washer.

Figure 5 is a perspective view of the cap and its curtain removed from the seed-cup.

Similar letters of reference indicate corresponding parts in the several figures.

This invention relates to an improvement on the seed-distributing device which was secured to me by Letters Patent of the United States, numbered, respectively, 45,443 and 86,026, and dated on the 13th day of December, A. D. 1864, and dated on the 19th day of January, 1869.

The distributers described in said Letters Patent, consist of spirally-grooved distributing-wheels, arranged in oblong cups, so as to discharge seeds through openings made through the back walls of these cups.

In the Letters Patent numbered 86,026, a cap was shown applied over the spirally-grooved distributing-wheel, for the purpose of causing the seeds, descending from the hopper into the seed-cup, to take a course through this cup and out of it, in the direction of rotation of said wheel, that is to say, to cause the seeds to pass beneath the wheel on their way to the discharge-opening through the cup.

In practice, I found that the opening for allowing the seeds to enter the seed-cup was so very small, that oats and other seeds would find lodgement at and bridge over this opening. This was caused by having the front edge of the cup over the distributing-wheel carried too far forward, so that there was not space enough between the cup and front end of the cap.

The nature of my invention and improvement consists in cutting away the front portion of the cap to the distributing-wheel, so that the front edge of this cap is in line with, or in rear of a vertical plane intersecting the axis of said wheel, and in extending the curtain of the cup far enough downward to prevent seed from escaping over the wheel, as will be hereinafter explained.

To enable others skilled in the art to understand my invention, I will describe its construction and operation.

In the accompanying drawings—

A represents the bottom of a seed-hopper, through the throat *a* of which the seeds fall into an oblong concavo-convex seed-cup, B, having sides which are perpendicular, or nearly so, to said seed-bottom.

Within this cup B, a spirally-grooved distributing-wheel, D, is arranged upon a shaft, C, so as to turn with this shaft in the direction indicated by the arrow in fig. 1; and at one or both ends of the wheel D, a washer, J, is applied to it, so as to turn with it, and prevent the seeds from being crushed between the end or ends of said wheel and the side or sides of the seed-cup B.

Where spiral grooves are made into the perimeter of a wheel, as indicated in fig. 2, only a single washer will be required, as the action of this wheel is to move the seeds laterally in one direction.

The lugs *j j*, on one end of wheel D, enter recesses in the washer J, and thus cause the latter to turn with its shaft C.

The parts above described, are constructed so as to operate substantially as described in my Letters Patent above referred to.

Vertical slots *g g* are made into the sides of the seed-cup B, for allowing the shaft C, with its wheel and washer, to be introduced into their places, or be readily removed therefrom.

These slots *g g* receive the vertical side-plates of a cap, E, which is arranged horizontally over the distributing-wheel D, so as to cause the seeds to pass into the seed-cup B from the direction indicated by the dotted edge *z* of this cap E, terminates in rear of a vertical plane intersecting the axis of wheel C, and the rear part *e* of this cap E is carried downward in the arc of a circle, concentric, or nearly so, to the axis of a wheel, D, so as to form a curtain, which will cover the rear portion of wheel D sufficiently to prevent seeds from escaping backward over this wheel.

Hitherto the seeds were prevented, in a degree, from escaping over the wheel D by extending the front edge of the cup to such wheel, to or forward of a vertical plane intersecting the axis of said wheel, the objection to which was, that there was not space enough left between the cap and the front part of the seed-cup to allow a free flow of seed into this cup from the hopper. Having cut away the front portion of the cap E, as shown in figs. 1, 2, and 5, it is necessary to lengthen the curtain *e*, and to have it lie closely to the wheel D.

By thus constructing the cap E, and fitting it to the wheel D, I am enabled to afford, with a cup, B, of a given length, a much larger throat-opening, *a*, than has hitherto been attained. By this means I preven seeds from clogging in or bridging over the passage leading from the hopper into the seed-cup.

I do not claim, broadly, under this petition, a cap cut-off applied to a distributing-wheel; but What I do claim, and desire to secure by Letters Patent, is—

1. The cap E, constructed with a concavo-convex curtain, e, and with its upper anterior edge z in, or in rear of a vertical plane intersecting the axis of shaft C, substantially as and for the purposes described.

2. While not claiming broadly a cap to a rotary seed-dropping wheel, I do claim so constructing the curtain e, of such a cap, that it will lie closely to the back of a spirally-grooved wheel, D, and prevent the escape of seeds over such wheel through its spiral grooves, substantially as and for the purposes described.

DANIEL E. McSHERRY.

Witnesses:
R. T. CAMPBELL,
J. N. CAMPBELL.